United States Patent
Agarwal et al.

(10) Patent No.: US 12,475,482 B2
(45) Date of Patent: *Nov. 18, 2025

(54) EXPORTER

(71) Applicant: Bytedance Inc., Wilmington, DE (US)

(72) Inventors: Nipun Agarwal, Mountain View, CA (US); Sudeep Srivastava, San Francisco, CA (US); Isaac Kim, Lincolnwood, IL (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,239

(22) Filed: Feb. 23, 2023

(65) Prior Publication Data

US 2023/0410142 A1 Dec. 21, 2023

Related U.S. Application Data

(63) Continuation of application No. 17/009,289, filed on Sep. 1, 2020, now Pat. No. 11,615,438, which is a (Continued)

(51) Int. Cl.
*G06F 21/00* (2013.01)
*G06N 20/00* (2019.01)
(Continued)

(52) U.S. Cl.
CPC ......... *G06Q 30/0242* (2013.01); *G06N 20/00* (2019.01); *H04L 63/08* (2013.01); *H04L 63/102* (2013.01)

(58) Field of Classification Search
CPC .... G06Q 30/0242; G06N 20/00; H04L 63/08; H04L 63/102
See application file for complete search history.

(56) References Cited

U.S. PATENT DOCUMENTS 6,182,050 B1 * 1/2001 Ballard .............. G06Q 30/0264
709/219
2002/0112238 A1 * 8/2002 Kanojia ........... H04N 21/25883
348/E7.071

(Continued)

OTHER PUBLICATIONS

U.S. Appl. No. 17/009,289, filed Sep. 1, 2020, U.S. Pat. No. 11,615,438, Issued.

(Continued)

*Primary Examiner* — Ghazal B Shehni
(74) *Attorney, Agent, or Firm* — Alston & Bird LLP

(57) ABSTRACT

A method, apparatus, and computer program product are disclosed for self-service design, scheduling, and delivery of user-defined reports regarding promotions. The method includes receiving, from a user device, a report type and report delivery information. Based on the report type, relevant data regarding the one or more promotions is collected, using which a report is generated. The method then outputs the generated report based on the report delivery information. Optionally, analytical insights, such as trends within the data, sample size, suitability of control data, and indications of statistical significance, are generated and included in the report. A corresponding apparatus and computer program product are also provided.

18 Claims, 7 Drawing Sheets

Related U.S. Application Data continuation of application No. 15/489,057, filed on Apr. 17, 2017, now Pat. No. 10,796,334, which is a continuation of application No. 14/820,722, filed on Aug. 7, 2015, now Pat. No. 9,646,321, which is a continuation of application No. 14/132,850, filed on Dec. 18, 2013, now Pat. No. 9,135,235.

(51) Int. Cl.
*G06Q 30/0242* (2023.01)
*H04L 9/40* (2022.01)

(56) References Cited

U.S. PATENT DOCUMENTS

| | | | |
|---|---|---|---|
| 2004/0039706 A1 | 2/2004 | Skowron et al. | |
| 2006/0106530 A1 | 5/2006 | Horvitz et al. | |
| 2008/0021759 A1 | 1/2008 | Wasley | |
| 2008/0147505 A1 | 6/2008 | Davis | |
| 2008/0281680 A1* | 11/2008 | Laor | G06Q 30/0254 705/7.32 |
| 2009/0228343 A1 | 9/2009 | Ford et al. | |
| 2009/0271275 A1* | 10/2009 | Regmi | G06Q 30/0245 705/14.73 |
| 2011/0137733 A1* | 6/2011 | Baird | G06Q 30/02 705/14.68 |
| 2011/0153447 A1 | 6/2011 | Thomas et al. | |
| 2012/0191534 A1* | 7/2012 | Tavares | G06Q 30/0246 705/14.45 |
| 2013/0060641 A1* | 3/2013 | Al Gharabally | G06Q 30/02 705/14.66 |
| 2013/0073336 A1 | 3/2013 | Heath | |
| 2013/0097007 A1 | 4/2013 | Brewer | |
| 2014/0052522 A1* | 2/2014 | Irani | G06Q 30/0225 705/14.26 |
| 2014/0259049 A1* | 9/2014 | Wang | G06Q 30/02 725/32 |

OTHER PUBLICATIONS

U.S. Appl. No. 15/489,057, filed Apr. 17, 2017, U.S. Pat. No. 10,796,334, Issued.
U.S. Appl. No. 14/820,722, filed Aug. 7, 2015, U.S. Pat. No. 9,646,321, Issued.
U.S. Appl. No. 14/132,850, filed Dec. 18, 2013, U.S. Pat. No. 9,135,235, Issued.
Notice of Allowance from U.S. Appl. No. 14/132,850 dated Aug. 3, 2015.
Office Action from U.S. Appl. No. 14/132,850 dated Feb. 13, 2015.

* cited by examiner

EXPORTER LOGIN

USERNAME: ☐ — 502
PASSWORD: ☐

504 — Register     506 — Login

FIG. 5A

CUSTOMIZE YOUR REPORT

508 — NAME YOUR REPORT: ☐

510 — SELECT DATA SOURCE:
- Historical Database
- Promotional Database
- Proprietary Database DATA ELEMENTS TO CAPTURE:
512 —
- Data Type 1
- Data Type 2
- Data Type 3

514 — DISPLAY TRENDS? ☐         DISPLAY STATISTICAL INFORMATION? ☐ — 516

518 — Submit

FIG. 5B

EXPORTER

CROSS-REFERENCE TO RELATED APPLICATION

The present application is a continuation of and claims priority to U.S. patent application Ser. No. 17/009,289, filed Sep. 1, 2020, which is a continuation of and claims priority to U.S. patent application Ser. No. 15/489,057 (now U.S. Pat. No. 10,796,334), filed Apr. 17, 2017, which is a continuation of and claims priority to U.S. patent application Ser. No. 14/820,722 (now U.S. Pat. No. 9,646,321), filed Aug. 7, 2015, which is a continuation of and claims priority to U.S. patent application Ser. No. 14/132,850 (now U.S. Pat. No. 9,135,235), filed Dec. 18, 2013, the entire contents of each of which are incorporated herein by reference.

TECHNOLOGICAL FIELD

Example embodiments of the present invention relate generally to document generation and, more particularly, to a method and apparatus for self-service design, scheduling, and delivery of user-defined reports regarding promotions.

BACKGROUND

Applicant has discovered problems with current methods for generating reports regarding promotions. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for improving the design, scheduling, and delivery of reports regarding promotions.

In a first example embodiment, a method is provided for automating the generation of reports regarding one or more promotions. The method includes receiving, from a user device, a report type and report delivery information, collecting, based on the report type, relevant data regarding the one or more promotions, generating, by a processor, a report using the collected data, and outputting the generated report based on the report delivery information.

In one embodiment of the method, the report delivery information indicates a desired delivery frequency. In another embodiment, the report type indicates a subscription to a standardized report. In yet another embodiment, the report type specifies framework parameters for the report.

In another embodiment, the method further includes generating, based on the report delivery information, an analytical insight regarding the data contained in the report, wherein the generated report includes the analytical insight. In this regard, the analytical insight may include at least one selected from the group consisting of: trends within the data, a sample size, suitability of control data, and an indication of statistical significance.

In yet another embodiment, the method includes receiving login credentials from the user device, and validating that the report type and report delivery information are accessible based on access rights associated with the login credentials.

In another example embodiment, an apparatus is provided for generating reports regarding promotions. The apparatus includes a processor and a memory, the memory storing computer program code that, when executed by the processor, causes the apparatus to receive, from a user device, a report type and report delivery information, collect, based on the report type, relevant data regarding the one or more promotions, generate a report using the collected data, and output the generated report based on the report delivery information.

In one embodiment of the apparatus, the report delivery information indicates a desired delivery frequency. In another embodiment, the report type indicates a subscription to a standardized report. In yet another embodiment, the report type specifies framework parameters for the report.

In another embodiment, the computer program code, when executed by the processor, further causes the apparatus to generate, based on the report delivery information, an analytical insight regarding the data contained in the report, wherein the generated report includes the analytical insight. In this regard, the analytical insight may include at least one selected from the group consisting of: trends within the data, a sample size, suitability of control data, and an indication of statistical significance.

In yet another embodiment, the computer program code, when executed by the processor, further causes the apparatus to receive login credentials from the user device, and validate that the report type and report delivery information are accessible based on access rights associated with the login credentials.

In another example embodiment, a computer program product is provided for generating reports regarding promotions. The computer program product includes a computer-readable storage medium storing computer program code that, when executed by an apparatus, causes the apparatus to receive, from a user device, a report type and report delivery information, collect, based on the report type, relevant data regarding the one or more promotions, generate a report using the collected data, and output the generated report based on the report delivery information.

In one embodiment of the computer program product, the report delivery information indicates a desired delivery frequency. In another embodiment, the report type indicates a subscription to a standardized report. In yet another embodiment, the report type specifies framework parameters for the report.

In another embodiment, the computer program code, when executed by the apparatus, further causes the apparatus to generate, based on the report delivery information, an analytical insight regarding the data contained in the report, wherein the generated report includes the analytical insight. In this regard, the analytical insight may include at least one selected from the group consisting of: trends within the data, a sample size, suitability of control data, and an indication of statistical significance.

In yet another embodiment, the computer program code, when executed by the apparatus, further causes the apparatus to receive login credentials from the user device, and validate that the report type and report delivery information are accessible based on access rights associated with the login credentials.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
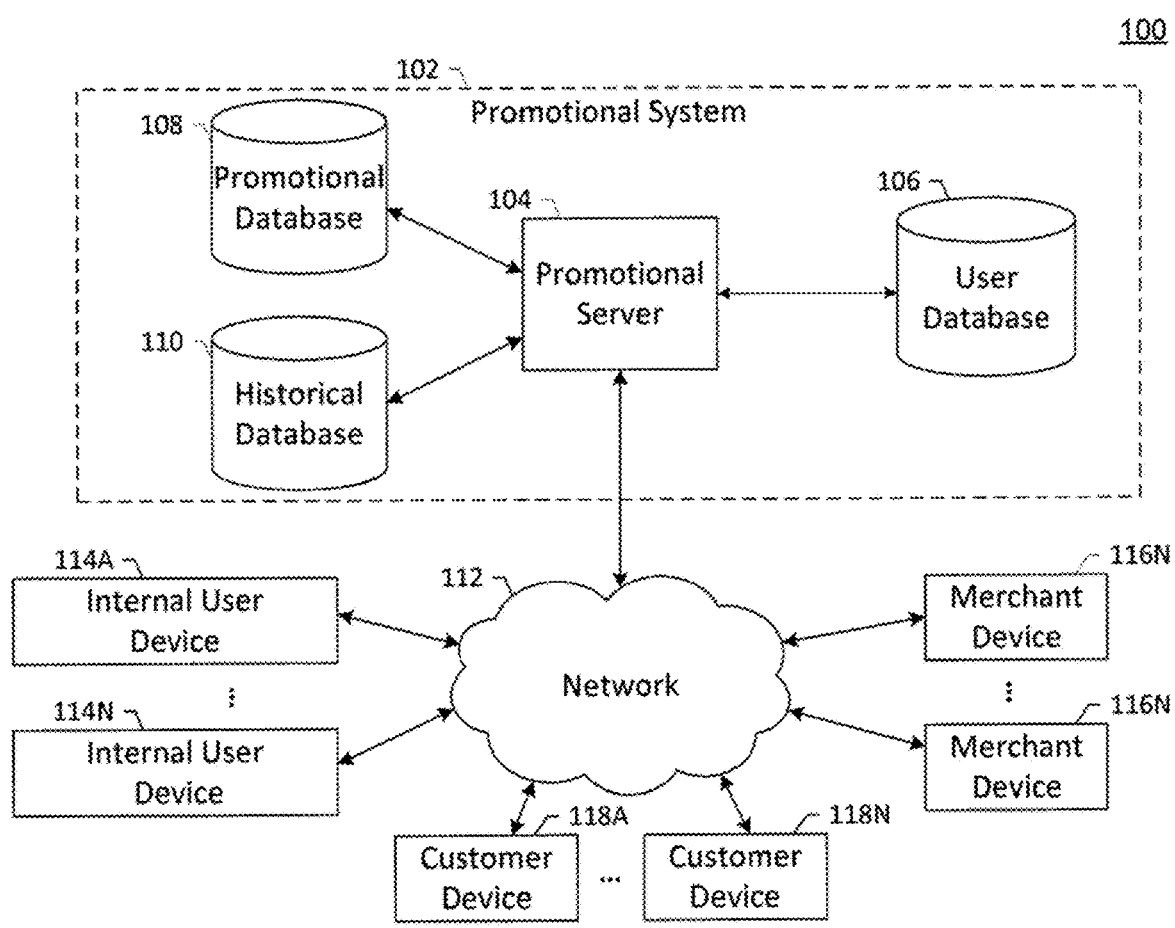
Figure 2:
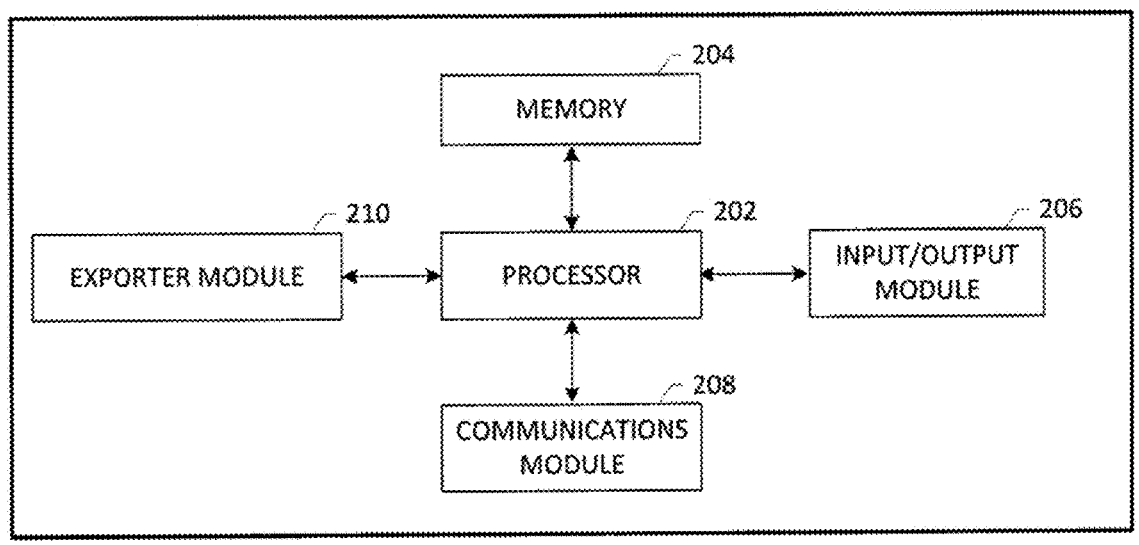
Figure 3:
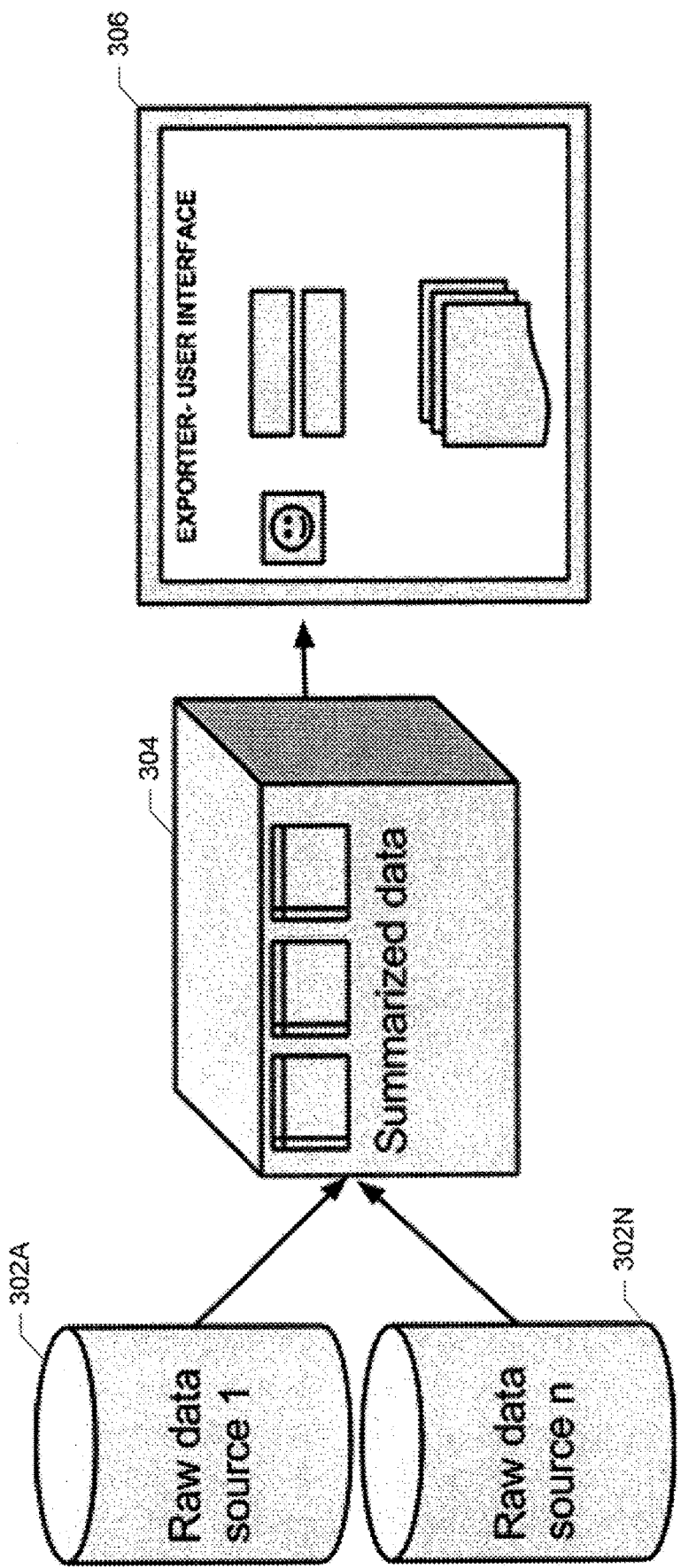

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates an example diagram of one mechanism by which data from the various databases can be captures, packaged, and presented to a user, in accordance with some example embodiments.

Figure 4:
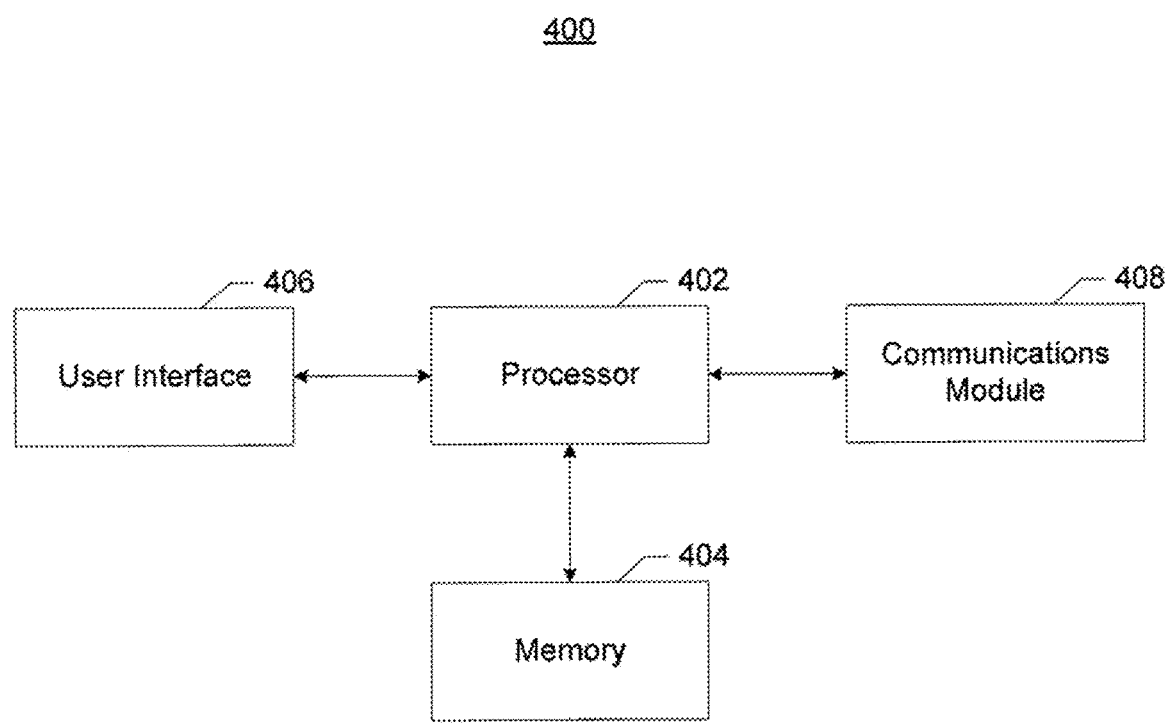
Figure 6:
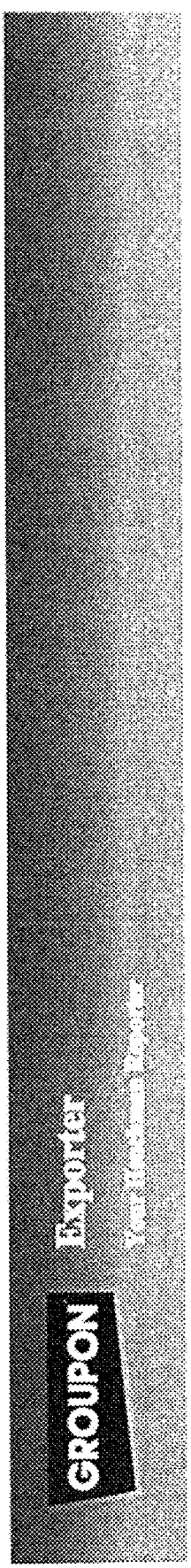
Figure 7:
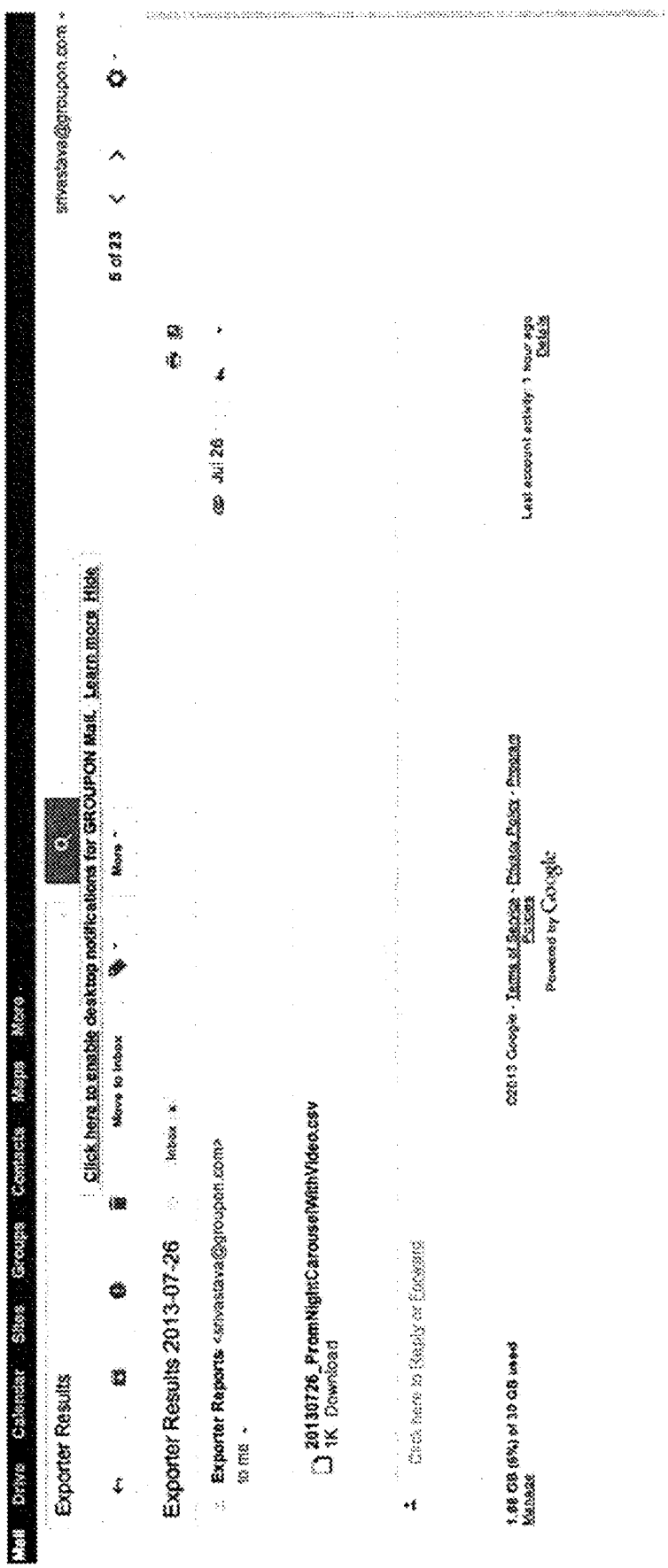
Figure 8:
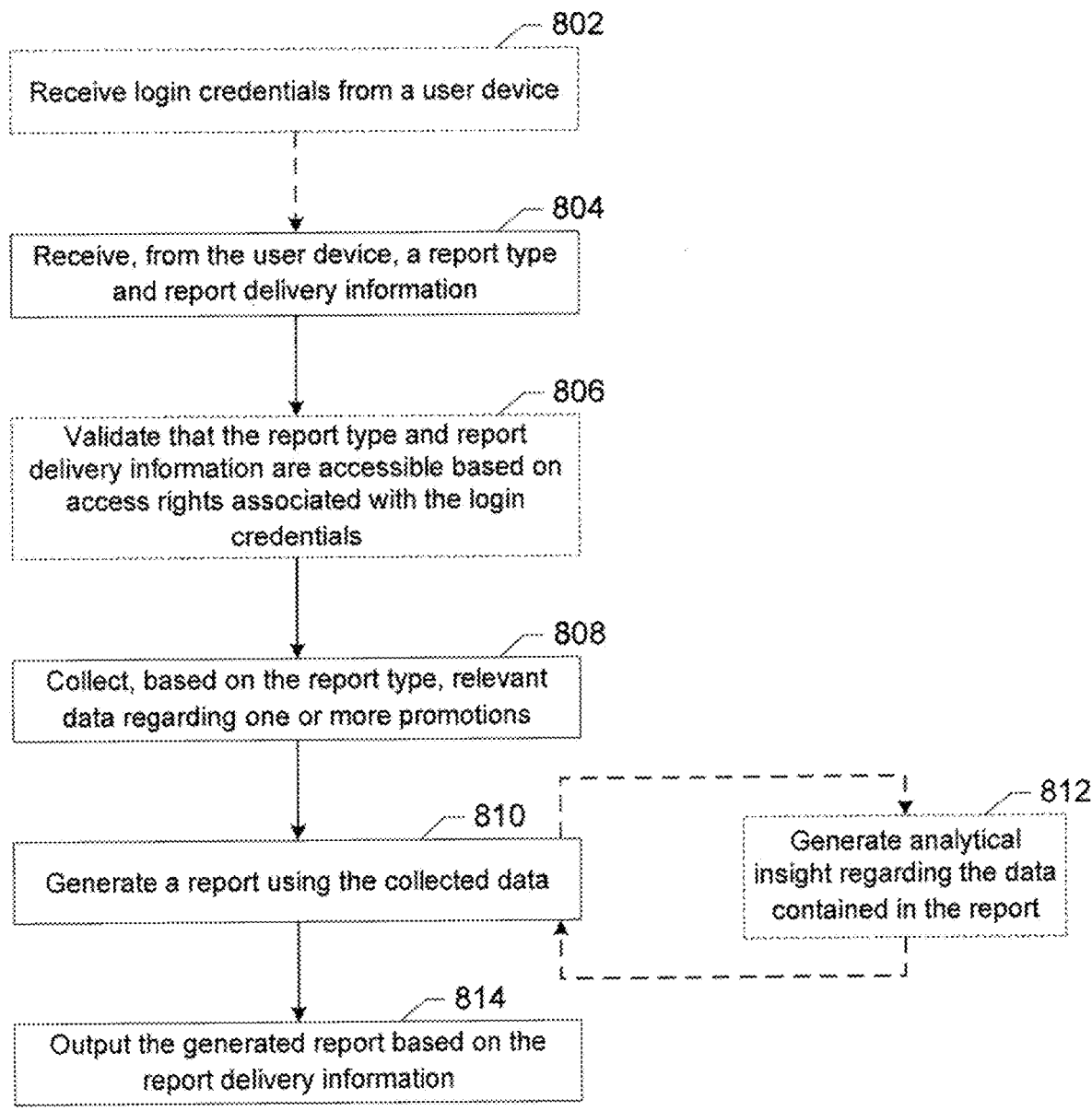

FIG. 4 illustrates a block diagram showing an example device for use by an internal user, a merchant, or a customer, in accordance with an example embodiment of the present invention;

FIG. 5A illustrates a user interface using which a user may create a user profile or login to a promotional system, in accordance with some example embodiments;

FIG. 5B illustrates a user interface using which a user may create a custom report, in accordance with some example embodiments;

FIG. 6 illustrates a user interface using which a user may schedule delivery frequency of one or more reports, in accordance with some example embodiments;

FIG. 7 illustrates an email interface using which a user may receive delivery of a report, in accordance with some example embodiments; and FIG. 8 illustrates a flowchart describing example operations for report design, scheduling, and delivery, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

Overview

A method, apparatus, and computer program product are provided in accordance with an example embodiment of the present invention in order to enable the self-service design, scheduling, and delivery of reports regarding promotions.

A promotion and marketing service having many hundreds, if not thousands, of employees, and orders of magnitudes more partnering merchants and customers, necessarily will generate, track, and store large volumes of data every day. This data may include the structure of the myriad of promotions offered by the promotion and marketing service, information regarding the historical success of the promotions, information regarding the merchants partnering with the promotion and marketing service, and, of course, information regarding the activity of customers who purchase promotions from the promotion and marketing service. Such a vast amount of data can only meaningfully provide insights when presented in a well-designed report. However, traditionally such reports are manually designed and generated.

Moreover, some reports may be frequently accessed, thus resulting in a great deal of duplicated effort. In addition, because the number of individuals who may benefit from the data stored by the promotion and marketing service is almost always greater than the number of individuals who prepare and deliver reports, there is an ever-present worry that bottlenecks will prevent the timely delivery of important reports.

In addition, while reports may sometimes be used simply to track basic metrics regarding promotions for an internal employee, reports are also sometimes used to analyze the results of experiments that are run to identify how the structure of a promotion may affect the frequency with which a promotion is redeemed. However, for such experiments to be valuable, it is often necessary to statistically analyze the variable and control populations within the experiment. Using manual reporting, such procedures are cumbersome and introduce the possibility of human error.

Accordingly, embodiments of the present invention improve upon manual reporting procedures by providing a system that can flexibly automate reporting functionality. In this regard, in some embodiments a system is provided that may store standard reports that are frequently accessed by employees, merchants, and/or customers. The system may enable users to select common reports they wish to receive and to schedule a reporting frequency. In one such embodiment, this system may be extended to enable users to design their own reports, using a self-service graphical user interface (GUI).

Additionally or alternatively, embodiments of the present invention contemplate improving upon this data reporting functionality by inserting analytical insight that might otherwise need to be generated manually. For instance, trends in the data may be highlighted, the sample size of the data captured in the report may be presented, and the control versus variant suitability and/or statistical significance of experimental results may be generated and displayed as part of the report.

As a result, embodiments of the present invention enable the design, scheduling, and delivery of reports that are more reliable, reproducible, and which do not suffer from the potential bottleneck caused by manual report generation. In this fashion, the present invention increases the ability of stakeholders to maximize the value of the large amount of data stored by the promotion and marketing service.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as one or more personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Users, including internal users (e.g., employees of the promotion and marketing service), merchants, and customers may access a promotional system 102 via a network 112 (such as the Internet, or the like) using computer devices 114A through 114N, 116A through 116N, and 118A through 118N, respectively. Moreover, the promotional system 102 may comprise a promotional server 104 in communication with a user database 106 that stores login credentials, access rights, and reporting preferences of the various users. The promotional system 102 may further have access to promotional database 108 that stores promotions offered by the promotional system 102, and historical database 110 that stores historical information regarding previously offered promotions. In some embodiments, the promotional system 102 may include or be in communication with additional proprietary databases (not shown in FIG. 1) that may provide additional data not contained within the promotional database 108 or historical database 110. The promotional system 102 is thus, in some examples, able to facilitate the designing, scheduling, and delivery of reports to the various users, as will be described below.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, and an exporter module 210, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading. In an example embodiment, the processor 202 may be configured to execute instructions stored in the memory 204 or otherwise accessible to the processor. Additionally or alternatively, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The exporter module 210 may be used to design, schedule, and deliver reports based on user preference. In this regard, the exporter module 210 may include four functions that enable the promotional system 102 to perform various embodiments of the present invention that are described herein.

First, the exporter module 210 may include a query function that can access promotional database 108, historical database 110, and any additional proprietary databases that may be relevant to a particular report. Each query may be prompted by the design of a specific report and by running various queries the exporter module 210 may collect the data necessary for the specific report.

Second, the exporter module 210 may include a user profile generation function that creates profiles for the various users that may interact with the promotional system 102. In this regard, this profile generation function enables the exporter module 210 to generate login credentials, associated access rights for accessing the data stored in the promotional database 108, historical database 110, and any other proprietary databases. Once created, the user profile may be stored in user database 106.

Third, the exporter module 210 may include a report designing function that enables individual users to build reports that will deliver information relevant to their specific needs, as discussed in greater detail below. The designed reports may also be stored in the user database 106 in association with the user profile of the user who designed the report, and a description of any access level information that may be relevant to the particular report (e.g., if sensitive customer data will be included in the report, only other users having relevant access rights may receive the report). In this regard, the variables that may be customized in a user-designed report may include a date range of data, a frequency with which results are updated, experiment(s) name, statistical properties such sample size estimates, specific inputs and output metrics depending on the experiment(s), experiment(s) results, and conclusions.

Fourth, the exporter module may include a scheduler that enables individual users to schedule the generation and delivery of their desired reports. In this regard, reports may be scheduled or delivered on a periodic basis (e.g., once a day, once a week, once a month, etc.). The scheduling information may also then be associated with relevant user profiles in the user database 106.

Turning now to FIG. 3, an example diagram is shown that illustrates one mechanism by which data from the various databases can be captured, packaged, and presented to a user. As shown, raw data sources 302A through 302N may correspond to promotional database 108, historical database 110, and/or any proprietary databases that may be accessible by the promotional system 102. Data from these raw data sources may be harvested by exporter module 210 and summarized, as shown in element 304 of FIG. 3. This summary may include the data collected from the raw data sources, but as described in greater detail below, the summarized data may also include charts and trends, analytical insights and conclusions, and interactive dashboards for the benefit of the user, which may be collected into the form of a report. Finally, the report may be presented to a user via user interface 306, which in one embodiment may comprise input/output module 206. However, while an internal user may use the apparatus 200 to design, schedule, and retrieve reports in accordance with example embodiments of the present invention, other embodiments contemplated by the presented invention may run outside of the promotional system 102, such as, for example, on an end-user device, which may be a distinct internal user device 114, or a merchant device 116 or customer device 118.

Referring now to FIG. 4, a block diagram is illustrated showing an example apparatus 300 that may be configured to enable a user to interact with the promotional system 102 from a remote device, in accordance with embodiments of the present invention.

In FIG. 4, the apparatus 400, which may embody internal user device 114, merchant device 116, or customer device 118, may include or otherwise be in communication with a processor 402, a memory 404, a user interface 406, and a communications module 408. In some embodiments, the processor (and/or co-processor or any other processing circuitry assisting or otherwise associated with the processor) may be in communication with the memory 404 via a bus for passing information among components of the apparatus 400. The memory 404 may be non-transitory and may include, for example, one or more volatile and/or non-volatile memories. In other words, for example, the memory 404 may be an electronic storage device (e.g., a computer readable storage medium). The memory 404 may be configured to store information, data, content, applications, instructions, or the like, for enabling the apparatus to carry out various functions in accordance with an example embodiment of the present invention.

The processor 402 may be embodied in a number of different ways and may, for example include one or more processing devices configured to perform independently. Additionally or alternatively, the processor 402 may include one or more processors configured in tandem via a bus to enable independent execution of instructions, pipelining, and/or multithreading. In an example embodiment, the processor 402 may be configured to execute instructions stored in the memory 404 or otherwise accessible to the processor. Alternatively or additionally, the processor 402 may be configured to execute hard-coded functionality. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include a user interface 406 that may, in turn, be in communication with processor 402 to provide output to the user and, in some embodiments, to receive an indication of a user input. As such, the user interface 406 may include a display and may comprise a web user interface, a mobile application, a client device, or the like. In some embodiments, the user interface 406 may also include a keyboard, a mouse, a joystick, a touch screen, touch areas, soft keys, a microphone, a speaker, or other input/output mechanisms. The processor 402 and/or user interface circuitry comprising the processor may be configured to control one or more functions of one or more user interface elements through computer program instructions (e.g., software and/or firmware) stored on a memory accessible to the processor (e.g., memory 404, and/or the like).

Meanwhile, the communications module 408 may be any means such as a device or circuitry embodied in either hardware or a combination of hardware and software that is configured to receive and/or transmit data from/to a network and/or any other device or module in communication with the apparatus 400. In this regard, the communication module 408 may include, for example, an antenna (or multiple antennas) and supporting hardware and/or software for enabling communications with a wireless communication network. Additionally or alternatively, the communication module 408 may include the circuitry for interacting with the antenna(s) to cause transmission of signals via the antenna(s) or to handle receipt of signals received via the antenna(s). In some environments, the communication module 408 may additionally or alternatively support wired communication. As such, for example, the communication module 408 may include a communication modem and/or other hardware/software for supporting communication via cable, digital subscriber line (DSL), universal serial bus (USB), or other mechanisms.

User Credentialing and Report Customization

Turning now to FIG. 5A, a user interface is illustrated using which a user (e.g., internal user, merchant, or customer) may create a user profile or login to the promotional system 102. As shown in element 502, each user may have an associated username and password, which may further be associated with a profile in user database 106. When the user has never used the report exporting functionality of the promotional system 102, the user may first need to register a username and password, and may accordingly select icon 504. Alternatively, when the user has already registered his account (and accordingly has a user profile stored in user database 106), the user may select the login icon 506.

Based on whether the user is an internal user (as noted above, an employee of the promotion and marketing service), a merchant, or a customer, different access rights may be associated with the user profile in user database 106. In this regard, while an internal user may have complete access to all of the data stored in promotional database 108 and historical database 110, in some embodiments, merchants and customers may not be able to access the entirety (i.e., may have more limited access) of this information. Rather, a merchant may be able to access its own promotion and history information, while a customer may only be able to access the information regarding promotions and merchants with which the customer has done business. Nevertheless, a merchant may have additional proprietary databases curated outside of the promotional system 102 that may be relevant to reports that the merchant would like to view. In this regard, it may in some embodiments, be possible for the merchant to have access rights greater than those of an internal user. A similar possibility exists for a customer user, although it is less likely that a customer would separately have access to any external proprietary databases.

Once logged in, a user (e.g., an internal user, a merchant, a customer, etc.) may wish to design new reports that appeal to their particular desires. In this respect, a report customization screen may be presented to the user while the user is logged into the promotional system 102, such as that shown in FIG. 5B. While it is possible to simply request access to standardized reports, in some example embodiments, a user may customize reports that best suit that user's unique viewing needs.

An internal user may wish to use the reporting service to run experiments to optimize the operation of the promotion offering process. For instance, the internal user may wish to identify how the structure of a promotion affects the frequency with which a promotion is redeemed. For instance, the size of an image associated with a promotion may affect the number of customers who are sufficiently interested to purchase the promotion. However, for this experiment to provide statistically significant results, it is necessary to analyze the relevant variable (here, image size) and control populations within the experiment. Accordingly, the custom report may enable the internal user to better identify the merit of an original hypothesis that image size affects the rate of promotion purchasing.

In contrast, a merchant may wish to generate reports regarding the performance of its promotions or may wish to run experiments to identify potential ways in which the merchant may improve the effectiveness of its promotions. For instance, a merchant may typically run a promotion every Tuesday night from 5 pm to 9 pm, but may be interested in seeing whether sales are increased if the promotion is moved to a different night. Accordingly, the merchant may run an experiment by modifying promotion terms and developing a custom report that provides relevant information regarding the relative success of the modified promotion.

Finally, customers may wish to run periodic summary reports charting their usage of promotions, cumulative savings, or to identify new promotions that may appeal to them based on their purchasing history. Each such use case may be generated from an interface such as the example illustrated in FIG. 5B.

As shown in item 508 of FIG. 5B, a user may first name a new report that will be generated. In item 510, the user may additionally specify a source from which the customized report will collect data by, for example, using a pull-down menu shown in item 510. In this regard, the data source may be promotional database 108, historical database 110, any proprietary database to which the promotional system 102 has access, or any combination of the above. Based on the selection of data source from item 510, a list of data types may be presented in a pull-down menu shown in item 512 that are accessible from the selected data sources. For instance, if promotional database 108 is selected, the data types may indicate different types of data that may be relevant to the user customizing the report. In one example, in anticipation of the Christmas shopping season, a customer may wish to view all of the clothing promotions that are available in his geographical area, and may thus select one or more data types that correspond to these desired promotion categories. As another example, a merchant may wish to view a list of all promotions that the merchant currently offers for a particular product category. As yet another example, an internal user may wish to view a first data type of promotions for which an impression of the promotion includes a picture, and a second data type of promotions for which the impression of the promotion does not include a picture (for subsequent analysis against each other).

Once the data for inclusion in the report has been selected, the user may optionally select analytical insights that the user may find helpful in evaluating the report. In this regard, the user may, in one example, check a box 514 instructing the promotional system 102 to display trends in the data for this custom report. Additionally or alternatively, the user may check a box 516 instructing the promotional system 102 to generate statistical information regarding the data included in the report (e.g., sample size in the report, control versus variable suitability, an indication of the statistical significance of the report results, or the like). In one embodiment, there may be a "Contact Us" icon (not shown) which, upon selection, will enable a user to ask for personalized support while generating a report. In this fashion, the report may be specifically tailored the particular goals of the individual user. Of course, alternatively or additionally, the user interface may include one or more drop down boxes or other types of list boxes that contain additional customizable information that might be relevant to a user, such as, for example, communication alerts and/or flags for abnormal trends or issues with any experiments or reports. Once customization of the report is complete, the user may select the Submit icon 518 to store the report in the user database 106.

Report Scheduling and Delivery

Turning now to FIG. 6, another user interface is shown, using which a user may customize which reports the user would like to run, and identify a frequency with which the user would like to receive the report. In this regard, the user may select a standardized report that may be prepopulated by the promotional system 102 (e.g., by exporter module 210 or the like), but which may also include the customized reports generated by the user as described above. The frequency with which the report is retrieved may be hourly, daily, weekly, monthly, or any other periodic interval desired by the user. Moreover, this interface also enables a user to select a subscription frequency for more than one report. Finally, the user may enter an email address at which the user would like to receive the report.

FIG. 7 illustrates an example email that may be received from the promotional system 102. The email includes the report as an attachment (in this case, 20130726-PromNight-CarouselWithVideo.csv"), for easy access by the user.

Promotional System Operations

Turning now to FIG. 8, example operations for report design, scheduling, and delivery are provided. The operations illustrated in FIG. 8 may, for example, be performed by the promotional system 102 (e.g., promotional server 104), with the assistance of, and/or under the control of one or more devices, such as apparatus 200, and may use processor 202, memory 204, input/output module 206, communications module 208, and exporter module 210.

Optionally, in operation 802, the apparatus 200 may include means, such as input/output module 206, communications module 208, or the like, for receiving login credentials from a user device. While in some embodiments, it may be possible to access reports anonymously based on the degree of sensitivity of the information contained in the requested reports (in which case this operation may not be required in some embodiments), in other embodiments as described above, it is incumbent upon a user to enter login credentials to access the promotional system 102.

Then, in operation 804, the apparatus 200 includes means, such as input/output module 206, communications module 208, exporter module 210, or the like, for receiving, from the user device, a report type and report delivery information. In this regard, the report type may indicate a subscription to a standardized report. Additionally or alternatively, the report type may specify framework parameters for the report (e.g., a customized report). The report delivery information may indicate a desired delivery frequency of the report.

Optionally, in operation 806, the apparatus 200 includes means, such as memory 204, exporter module 210, or the like, for validating that the report type and report delivery information are accessible with the login credentials. Depending on the sensitivity of the information contained in the report being requested, it may be the case that a particular user does not have the necessary access rights to view the report. In this fashion, privacy of sensitive customer information, merchant information, or promotion and marketing service information may be maintained, even though the reporting functionality is automated.

In operation 808, the apparatus 200 includes means, such as processor 202, communications module 208, exporter module 210, or the like, for collecting, based on the report type, relevant data regarding one or more promotions. In this regard, this operation may occur after satisfaction of the validation performed in operation 806. This collection, as described above, may retrieve relevant data from promotional database 108, historical database 110, or any number of proprietary databases that are accessible by the promotional system 102.

In operation 810, the apparatus 200 includes means, such as processor 202, exporter 210, or the like, for generating a report using the collected data.

Optionally, in operation 812, the apparatus 200 may include means, such as processor 202, exporter module 210, or the like, for generating analytical insight regarding the data contained in the report. As described above, such analytical insight may regard trends in the data, suitability of control data, abnormalities in the experiment, statistical information such as sample size, significance, or the like, or any number of other analytical results that may be identified based on the set of data collected in the report. In this regard, the analytical insights may take into account customer visits, conversion rates, historical comparison of revenue and bookings, and can be automatically generated for each experiment. Moreover, in some embodiments the apparatus 200 may include one or more machine learning algorithms for predictive modeling of trends and/or analytical insights.

Finally, in operation 814, the apparatus 200 includes means, such as input/output module 206, communications module 208, exporter module 210, or the like, for outputting the generated report based on the report delivery information. In this fashion, via the presentation of a number of user interfaces, various embodiments presented herein provide a self-service mechanism by which users may design, schedule, and retrieve reports regarding promotions.

As described above, embodiments of the present invention enable the design, scheduling, and delivery of reports that are more reliable, reproducible, and which do not suffer from the potential bottleneck caused by manual report generation. In this fashion, the present invention increases the ability of stakeholders to maximize the value of the large amount of data stored by a promotion and marketing service.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for automating generation of reports regarding one or more promotions, the method comprising:
   receiving, from a user device, a report type and report delivery information, the report delivery information comprising a scheduled reporting frequency dictating a frequency with which a generated report is output; and
   in a plurality of instances in accordance with the scheduled reporting frequency,
   collecting, based on the report type, relevant data regarding the one or more promotions;
   generating, by a processor, the generated report using the relevant data; and
   outputting the generated report based on the report delivery information.

2. The method of claim 1, wherein the report type indicates a subscription to a standardized report.

3. The method of claim 1, further comprising identifying, from stored data based on the report type, framework parameters for the generated report; wherein collecting the relevant data is based on the framework parameters.

4. The method of claim 1, further comprising generating, based on the report delivery information, an analytical insight regarding the relevant data contained in the generated report,
   wherein the generated report includes the analytical insight.

5. The method of claim 4, wherein the analytical insight includes at least one selected from a group consisting of: trends within the relevant data, a sample size, suitability of control data, and an indication of statistical significance.

6. The method of claim 1, further comprising:
   receiving login credentials from the user device; and
   validating that the report type and report delivery information are accessible based on access rights associated with the login credentials.

7. An apparatus for generating reports regarding one or more promotions, the apparatus comprising a processor and a memory, the memory storing computer program code that, when executed by the processor, causes the apparatus to:
   receive, from a user device, a report type and report delivery information, the report delivery information comprising a scheduled reporting frequency dictating a frequency with which a generated report is output; and
   in a plurality of instances in accordance with the scheduled reporting frequency,
   collect, based on the report type, relevant data regarding the one or more promotions;
   generate the generated report using the relevant data; and
   output the generated report based on the report delivery information.

8. The apparatus of claim 7, wherein the report type indicates a subscription to a standardized report.

9. The apparatus of claim 7, wherein the computer program code, when executed by the processor, further causes the apparatus to identify, from stored data based on the report type, framework parameters for the generated report; wherein collecting the relevant data is based on the framework parameters.

10. The apparatus of claim 7, wherein the computer program code, when executed by the processor, further causes the apparatus to:
generate, based on the report delivery information, an analytical insight regarding the relevant data contained in the generated report,
wherein the generated report includes the analytical insight.

11. The apparatus of claim 10, wherein the analytical insight includes at least one selected from a group consisting of: trends within the rlevant data, a sample size, suitability of control data, and an indication of statistical significance.

12. The apparatus of claim 7, wherein the computer program code, when executed by the processor, further causes the apparatus to
receive login credentials from the user device; and
validate that the report type and report delivery information are accessible based on access rights associated with the login credentials.

13. A computer program product for generating reports regarding one or more promotions, the computer program product comprising a non-transitory computer-readable storage medium storing computer program code that, when executed by an apparatus, causes the apparatus to:
receive, from a user device, a report type and report delivery information, the report delivery information comprising a scheduled reporting frequency dictating a frequency with which a generated report is output; and
in a plurality of instances in accordance with the scheduled reporting frequency,
collect, based on the report type, relevant data regarding the one or more promotions;
generate the generated report using the relevant data; and
output the generated report based on the report delivery information.

14. The computer program product of claim 13, wherein the report type indicates a subscription to a standardized report.

15. The computer program product of claim 13, wherein the computer program code, when executed by the apparatus, further causes the apparatus to identify, from stored data based on the report type, framework parameters for the generated report; wherein collecting the relevant data is based on the framework parameters.

16. The computer program product of claim 13, wherein the computer program code, when executed by the apparatus, further causes the apparatus to:
generate, based on the report delivery information, an analytical insight regarding the relevant data contained in the generated report,
wherein the generated report includes the analytical insight.

17. The computer program product of claim 16, wherein the analytical insight includes at least one selected from a group consisting of: trends within the relevant data, a sample size, suitability of control data, and an indication of statistical significance.

18. The computer program product of claim 13, wherein the computer program code, when executed by the apparatus, further causes the apparatus to:
receive login credentials from the user device; and
validate that the report type and report delivery information are accessible based on access rights associated with the login credentials.

* * * * *